United States Patent [19]

Yao et al.

[11] Patent Number: 4,563,202
[45] Date of Patent: Jan. 7, 1986

[54] METHOD AND APPARATUS FOR PURIFICATION OF HIGH $CO_2$ CONTENT GAS

[75] Inventors: Jame Yao; Jong J. Chen; Douglas G. Elliot, all of Houston, Tex.

[73] Assignee: DM International Inc., Houston, Tex.

[21] Appl. No.: 643,368

[22] Filed: Aug. 23, 1984

[51] Int. Cl.$^4$ .................................................. F25J 3/04
[52] U.S. Cl. .......................................... 62/17; 62/20; 62/28; 55/68; 55/73
[58] Field of Search .................. 55/38, 32, 48, 51, 68, 55/73; 62/17, 20, 24, 27, 28

[56] References Cited

U.S. PATENT DOCUMENTS

| | | | |
|---|---|---|---|
| 2,781,863 | 2/1957 | Bloch et al. | 55/73 |
| 2,804,488 | 8/1957 | Cobb | 55/51 |
| 2,806,552 | 9/1957 | Koble | 62/17 |
| 3,664,091 | 5/1972 | Hegwer | 55/48 X |
| 4,009,083 | 2/1977 | Lyon et al. | 55/32 X |
| 4,097,250 | 6/1978 | Pagani et al. | 55/48 |
| 4,270,937 | 6/1981 | Adler et al. | 62/17 |
| 4,370,156 | 1/1983 | Goddin et al. | 62/17 |
| 4,459,142 | 7/1984 | Goddin | 62/17 |
| 4,462,814 | 7/1984 | Holmes et al. | 62/17 |
| 4,466,946 | 8/1984 | Goddin et al. | 62/17 X |

Primary Examiner—Charles Hart
Attorney, Agent, or Firm—Bernard, Rothwell & Brown

[57] ABSTRACT

Disclosed is a method and apparatus for separating and purifying carbon dioxide and natural gas contained in the associated gas of an oil well. Feed containing hydrocarbons, carbon dioxide, water and hydrogen sulfide, is fed to a stabilizer column where heavy hydrocarbons and water are removed. Hydrogen sulfide is then stripped from the gas in a carbon dioxide fractionator using a solvent which absorbs $H_2S$ and increases the relative volatility of carbon dioxide to hydrogen sulfide. Overhead from the $CO_2$ fractionator contains carbon dioxide and light hydrocarbons, which are then separated in a demethanizer column which produces liquid carbon dioxide as a bottoms product. The invention is particularly useful in recovering carbon dioxide from the associated gas of oil produced from enhanced oil recovery processes using carbon dioxide injection.

19 Claims, 2 Drawing Figures

METHOD AND APPARATUS FOR PURIFICATION OF HIGH $CO_2$ CONTENT GAS

TECHNICAL FIELD

This invention relates to the art of gas and liquid separation processes and, more specifically, to a method and apparatus for the recovery of carbon dioxide and natural gas from a hydrocarbon stream which also contains hydrogen sulfide. The invention is particularly useful in enhanced oil recovery processes where carbon dioxide is the injected fluid and can constitute up to 90% of the associated gas recovered with the oil.

BACKGROUND ART

Natural gas, that is, a mixture of methane and small amounts of ethane, is often recovered from oil wells as part of the "associated" gas, which also includes significant amounts of other hydrocarbons such as propane, butane, etc. collectively known as natural gas liquids. In situ under high formation pressure, these gases are either compressed into liquids or are dissolved in the heavier hydrocarbon fractions, hence the name associated gas. As pressure is released during oil recovery, the lighter components again become gaseous. Besides hydrocarbons, associated gas also may contain carbon dioxide, nitrogen and hydrogen sulfide, which must be removed prior to utilizing the natural gas as fuel or chemical feedstock. Carbon dioxide and nitrogen detract from the heating value of the gas, while hydrogen sulfide is highly corrosive and noxious. Another common component of associated gas is water vapor which must also be removed.

In recent years, enhanced oil recovery processes have gained in importance due to the escalating price of petroleum products and the decline in oil reserves. In such processes, gases such as carbon dioxide or nitrogen are injected into the oil formation at strategic locations in order to drive normally unrecoverable oil to the production well. The injected gas becomes part of the associated gas leaving the well and must be separated as described above. Generally, a separation process must take account of the fact that the life of an oil well spans a number of years, and over that time the production rate may vary widely. In the initial years of production, little or no injected fluid is needed to maintain an adequate production level. However, as the well ages it becomes increasingly difficult to recover the petroleum. This is due in part to a decrease in formation pressure caused by prior years' production, but more importantly, a large portion of the crude petroleum is often "bound" to the surrounding formation and cannot be recovered absent some extraordinary means, hence, the need for injection of carbon dioxide or nitrogen. Generally, $CO_2$ is preferred in shallower carbonate oilbearing formations, while $N_2$ is used for deep wells.

The composition of the associated gas changes over time as more and more gas injectant is injected to maintain a given production rate. Thus, for example, the associated gas can have a carbon dioxide content of anywhere from 0 to 90 mole percent depending on the age of the well.

In enhanced recovery processes, the separation of injectant in the associated gas is important from the standpoint of obtaining usable natural gas and natural gas liquids, and even more importantly, for recycling the injection fluid in pure form. Injection fluid such as carbon dioxide has a high initial cost and, in the quantities needed, is expensive to transport and store. Separation and purification is therefore necessary from an economic standpoint. Apparatus for doing this should be capable of handling the entire range of $CO_2$ compositions, i.e., $CO_2$ levels of from essentially nil to 90 mole percent, and desirably the apparatus should produce sweetened residual natural gas and natural gas liquids for sale.

The prior art has heretofore utilized cryogenic distillation and absorption processes for separation and purification of associated gas components. A number of problems are encountered, however, when these processes are applied to carbon dioxide. The cryogenic separation of carbon dioxide and methane, for example, is complicated by the phase characteristics of $CO_2$ at distillation temperatures and pressures which give the most complete separation. Under certain conditions, carbon dioxide may "freeze out" of the distillation and in the process clog the apparatus. U.S. Pat. No. 4,318,723 seeks to avoid this by the addition of "solids-preventing agents" which permit distillation in the pressure-temperature region where solids would otherwise potentially occur. Thereby it is taught that near complete separation of $CO_2$ and methane is achieved without solids formation.

With regard to the removal of hydrogen sulfide from an associated gas stream, the use of absorption solvents has been known. U.S. Pat. No. 4,097,250 recites the use of dimethyletherdipolyglycol and propylene carbonate for this purpose. The desulfurization step occurs under conditions of relatively high temperatures (20° C. to 100° C.) and high pressures in the range from 100 to 200 kilograms/sq.cm. absolute (1422 psia to 2844 psia). Apparatus designed to withstand and handle such high pressures are often expensive. The major disadvantage in using these solvents, however, is that they co-absorb the majority of the natural gas liquids with the $H_2S$. The circulation of solvent is thereby increased and it is difficult to recover the natural gas liquids for sale.

U.S. Pat. No. 4,293,322 also deals with the separation of hydrogen sulfide from carbon dioxide. This patent suggests adding a $C_3$-$C_6$ alkane, a mixture of $C_3$-$C_6$ alkanes, $SO_2$ or $SO_3$ solvent to improve the distillative separation. Due to the low molecular weight of these solvents, the loss of solvent becomes significant and is difficult to avoid. Since the alkane solvent is extracted from the alkane portion in the feed associated gas, the regeneration energy consumption is comparatively high when using the lighter molecular weight alkane solvents ($C_3$-$C_5$). When $C_5+$ alkane solvents are used, sticky and waxy material originally contained in the feed is extracted. In addition, the solvent used in the plant operation is sensitive to the plant feed, which causes difficulties in maintaining optimum solvent circulation. The major disadvantage, however, of using an alkane based solvent is its poor selectivity between $CO_2$ and $H_2S$ compared to aromatic based solvents. Lesser selectivity or lesser relative volatility between $CO_2$ and $H_2S$ requires a higher reflux rate to facilitate distillation and higher solvent circulation rate. As a result, the refrigeration and solvent regeneration duties are both increased.

There thus remains a need for a more efficient separation process for recovery of natural gas and carbon dioxide from the associated gases from an oil well, in which moderate pressures are used and conditions of potential carbon dioxide freezing are avoided.

SUMMARY OF THE INVENTION

The instant invention relates to a method for recovery of carbon dioxide from a hydrocarbon feed stream containing carbon dioxide, methane and higher boiling hydrocarbon constituents, hydrogen sulfide, and water. The feed stream is dehydrated and phase separated in a stabilizer column containing a glycol compound, forming thereby a glycol/water phase, a liquid phase of heavy hydrocarbons, and a gas phase containing carbon dioxide, hydrogen sulfide and light hydrocarbons. The hydrogen sulfide and a portion of the light hydrocarbons are removed from the gas phase in a carbon dioxide fractionation step which includes injecting a solvent into a fractionator column to absorb hydrogen sulfide and hydrocarbons and to increase the relative volatility between the carbon dioxide and hydrogen sulfide. The solvent, hydrogen sulfide and hydrocarbons exit the fractionator as a bottom product. Carbon dioxide is separated and recovered from the residual hydrocarbons left in the overhead from the fractionator by distilling the overhead in a demethanizer column under conditions which produce liquid carbon dioxide as a bottoms product.

An apparatus useful in the recovery of carbon dioxide from a hydrocarbon feed stream containing carbon dioxide, methane and higher boiling hydrocarbon constituents, hydrogen sulfide, and water, comprises: a stabilizer column for separation of heavy hydrocarbons and water from a gaseous stream of carbon dioxide, lighter hydrocarbons and hydrogen sulfide, a carbon dioxide fractionator for removal of hydrogen sulfide and a portion of the light hydrocarbons from the gaseous stream by means of solvent injection, wherein the solvent injected into the fractionator absorbs hydrogen sulfide and hydrocarbons and increases the relative volatility of carbon dioxide to hydrogen sulfide, the solvent and absorbed components constituting a bottom product from the fractionator and the remaining components of carbon dioxide and residual hydrocarbons constituting a gaseous overhead, and a demethanizer column for separating the gaseous overhead stream from the carbon dioxide fractionator into a liquid carbon dioxide bottom stream and a gaseous overhead of residual hydrocarbons and carbon dioxide.

Central to the invention is the use of a very selective solvent, such as toluene, for removing $H_2S$ from $CO_2$. Since the regeneration of such a solvent from pentane and lighter substances can be easily carried out by distillation, the circulated solvent can remain unchanged during years of operation which is attractive from an operating point of view. Due to the high selectivity of the solvent, the solvent circulation rate is greatly reduced and so is the overhead reflux rate of the carbon dioxide fractionator. As a result, refrigeration and solvent regeneration requirements are both reduced. Since the circulated solvent can withstand high temperature, 550° F. or higher, in the regeneration step, it can also be used as a hot oil. This allows the heat integration of the whole plant which results in significant energy savings.

BEST MODE FOR CARRYING OUT THE INVENTION

Figure 1:
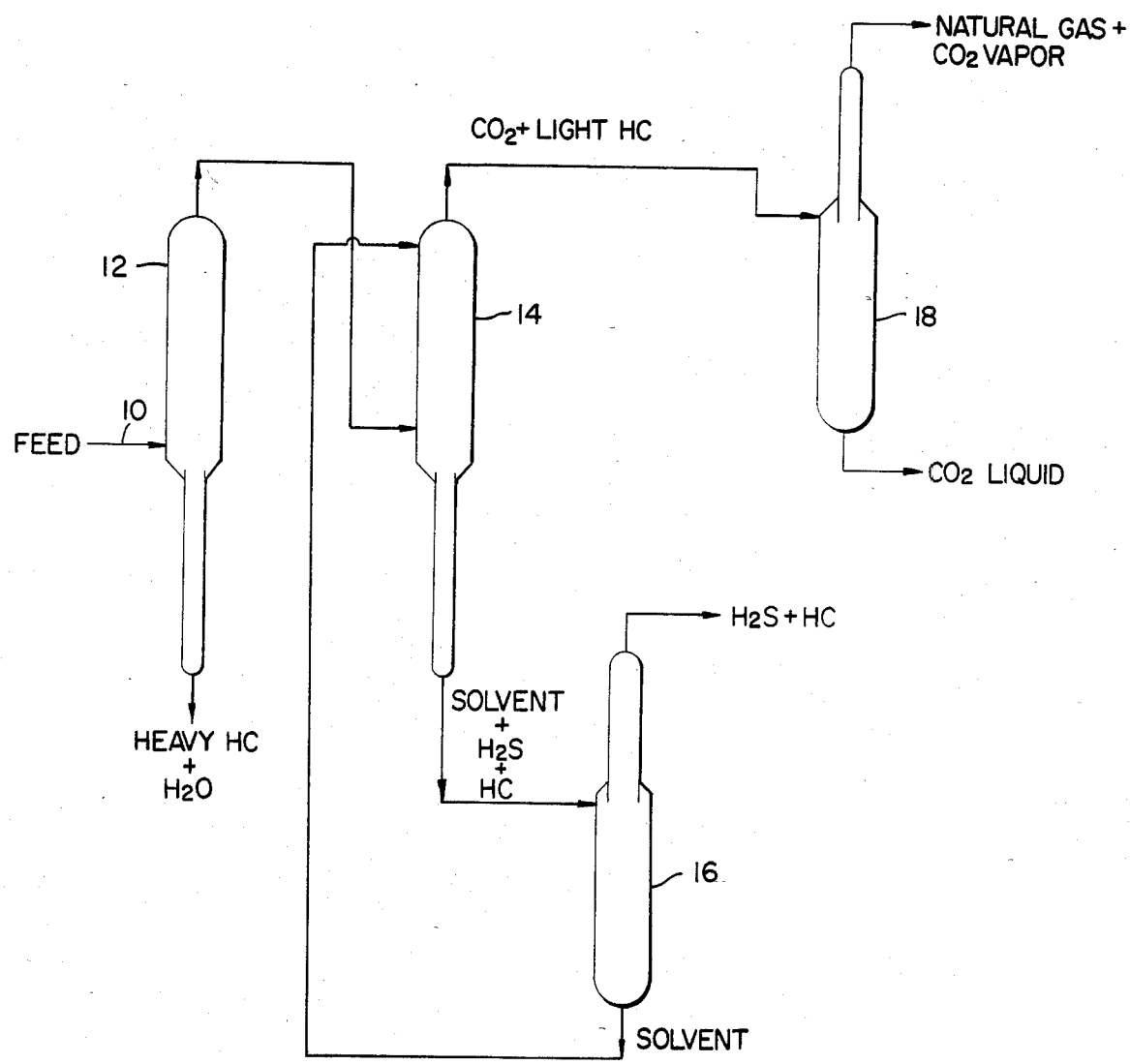
FIG. 1 is a simplified schematic diagram of the process of the invention.

The process of the invention can be used to separate and purify both carbon dioxide and natural gas found in oil well associated gas having a composition and flow rate which can vary widely. Reference is made to FIG. 1, illustrating the process in general schematic form. A hydrocarbon stream 10, which also includes carbon dioxide, hydrogen sulfide, and water, is fed to a stabilizer column 12 to remove water and heavier hydrocarbons as liquid. The overhead from the stabilizer, comprising primarily lighter hydrocarbons, carbon dioxide and hydrogen sulfide, is stripped of the hydrogen sulfide and some hydrocarbon material in a carbon dioxide fractionator 14 using an absorption solvent. In general, suitable absorption solvents include aromatic compounds having molecular weights between about 90 and about 125 and freezing points below about −50° F. Examples of such compounds include toluene, ethylbenzene, m-xylene and isopropylbenzene. Of these, toluene is preferred. Napthenic hydrocarbons can also be used having molecular weights between about 80 and about 130 and freezing points below about −50° F. Suitable napthenics include methylcyclopentane and methylcyclohexane. Mixtures of aromatics and/or napthenics are also useful. According to the availability of solvent and the requirements for natural gas liquids (NGL) production, any of the abovementioned solvents can be interchanged without interrupting plant operation.

The solvent, with its absorbed hydrogen sulfide and hydrocarbons, is removed as bottom product and is sent to a solvent regeneration column 16 where the hydrogen sulfide and hydrocarbons are removed as overhead. The solvent bottom from the regenerator is then recycled back to the carbon dioxide fractionator.

Overhead from the fractionator 14, comprised of $CO_2$, methane and ethane, is sent to a demethanizer column 18 where the carbon dioxide and hydrocarbons are separated. Carbon dioxide is removed as a liquid bottoms product having a purity greater than about 95 percent by weight. The overhead from the demethanizer 18 is a mixture of methane, ethane and carbon dioxide which is separated by conventional means in an absorber such as a Selexol unit.

Figure 2:
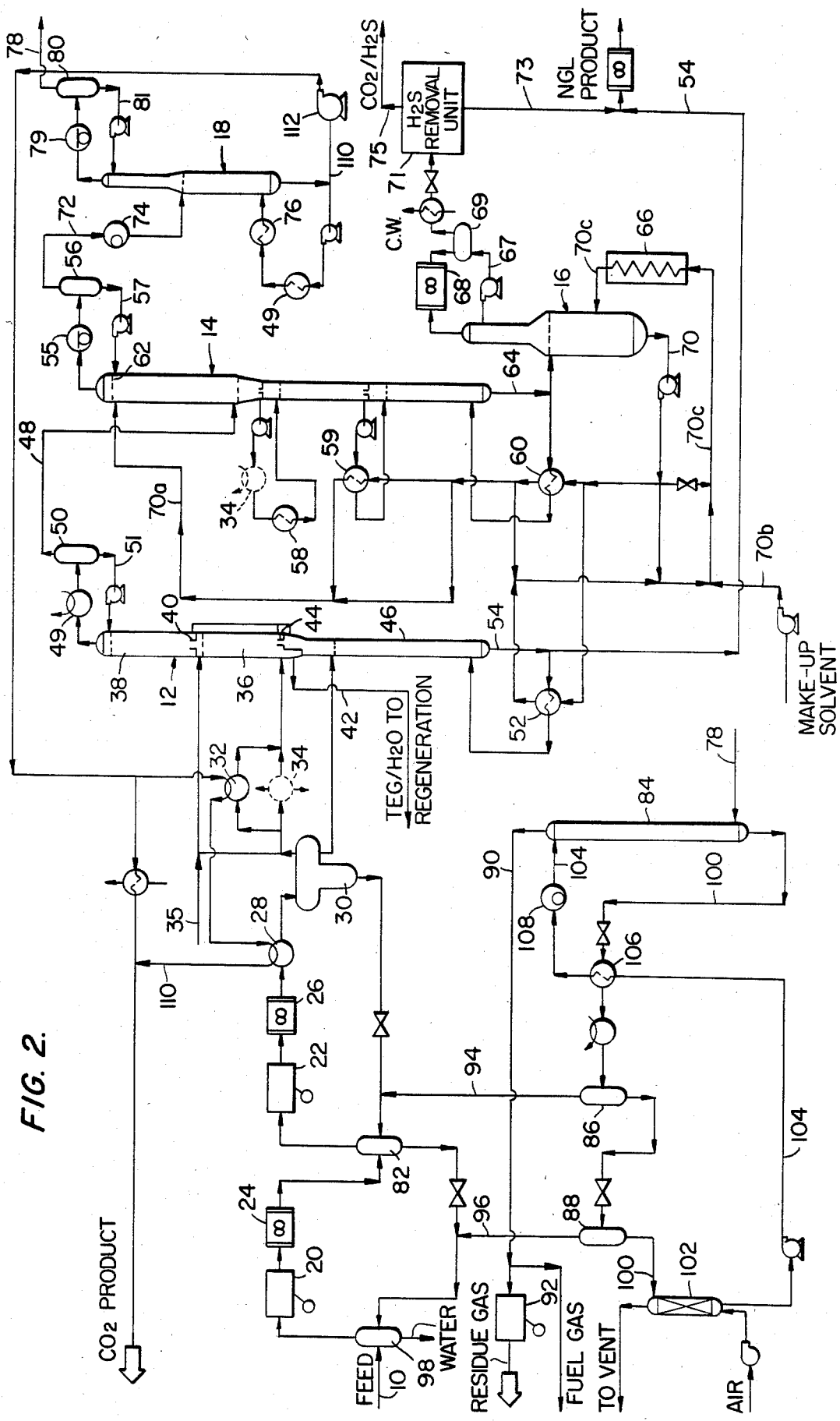
FIG. 2 is a detailed schematic of the process.

A preferred embodiment of the invention is illustrated in the detailed schematic of FIG. 2. Prior to entering the stabilizer column 12, the feed 10 is compressed to about 360 psia in two stages, using compressors 20 and 22. Intercooler 24 and aftercooler 26 reduce the feed temperature after each compression. A final temperature of about 65° F. is reached by heat exchange with the cold carbon dioxide product in heat exchanger 28.

At this temperature and pressure, a hydrocarbon liquid phase and an aqueous phase are formed, which can be separated from the gas phase in a three-phase separator 30. Water condensed at 65° F. is removed to minimize the need for glycol injection.

The gas phase from the separator 30 is further cooled to about 40° F. by cold carbon dioxide product in exchanger 32. In the early years of operation, when the amount of $CO_2$ product returned to the oil field is relatively small, additional cooling duty can be supplied by the side reboiler 34 of the $CO_2$ fractionator 14. Since a temperature of 40° F. is below the hydrate formation point, a compound such as triethylene glycol (TEG) or diethylene glycol (DEG) is injected upstream of exchangers 32 and 34 through line 35 to protect the system from freezing.

The cooled and compressed three-phase stream is sent to the glycol contactor section 36 of the stabilizer 5 where the gas is dehydrated countercurrently with lean glycol injected immediately below a chimney tray 40. The stabilizer is operated at a pressure of from about 200 psia to about 400 psia. Water and glycol leave the glycol contactor section through stream 42. Organic liquid comprising hydrocarbons of 4 or more carbon atoms which were condensed in heat exchangers 32 and 34 flow downward through chimney tray 44 into bottom section 46 of the stabilizer. The remaining gas fraction is refluxed in stabilizer section 38 to produce an overhead gas stream 48 containing essentially no hexane-plus hydrocarbons. Cooling for the reflux in section 38 is supplied by reboiling the demethanizer bottoms in exchanger 49. Condensed overhead is separated from vapor in separator 50 and refluxed to the column in stream 51. Reboiler duty to the bottoms section 46 of the stabilizer is supplied by heat exchanger 52. The hydrocarbon bottoms product leaves the stabilizer in stream 54 and comprises primarily butane, pentane and higher boiling hydrocarbons utilized as natural gas liquids.

The overhead gas stream 48 from the stabilizer, containing all the carbon dioxide, methane, ethane and most of the propane, is sent to carbon dioxide fractionator 14 for separating the carbon dioxide and hydrogen sulfide. The carbon dioxide fractionator is operated at a pressure of between about 200 and about 800 psia, and at a temperature of from about $-30°$ F. to about $30°$ F., and includes an overhead condenser 55, separator 56, recycle stream 57, two side reboilers 58 and 59, and a bottom reboiler 60. If pure toluene is the solvent, the fractionator is preferably operated at a pressure of about 320 psia and at a temperature of about $0°$ F.

Separation of carbon dioxide and hydrogen sulfide in the fractionator is effected by a combination of distillation and solvent absorption of $H_2S$. The solvent is preferably injected into the fractionator 14 at the top tray 62. Solvent, hydrogen sulfide and essentially all propane-plus hydrocarbons contained in the feed are included in the $CO_2$ fractionator bottom 64. Enough carbon dioxide is contained in the bottom stream to maintain a 1:1 ratio of carbon dioxide to hydrogen sulfide for a preferred feed to a Claus process. (Not shown)

The solvents used are highly selective for hydrogen sulfide. This reduces the solvent recirculation and reflux rate in the fractionator as well as the refrigeration and solvent regeneration requirements. Solvent is regenerated from the fractionator bottom stream 64 in the solvent regenerator 16 at essentially the same pressure as in the $CO_2$ fractionator and at a temperature of about $510°$ F. Heat is introduced into the regenerator 16 by a fired heater 66, while cooling for the reflux stream 67 is provided by an air cooler 68. Separator 69 removes condensed overhead from the vapor. The bottoms stream 70 from the regenerator 16 is essentially pure solvent, a portion of which is recycled back to the $CO_2$ fractionator. Since the temperature of the solvent is above $500°$ F., it can be used as a hot oil. The heat requirement of the plant can be supplied by circulating adequate amounts of the solvent through reboilers 52, 58, 59, 60, etc. This arrangement maximizes heat integration and confines the heat supply to a single source, namely, the fired heater 66. Injection into the fractionator is through slip stream 70a of the solvent drawn from the circulation and subcooled to the temperature required as absorbent. Make up solvent, can be supplied through line 70b to the solvent recycle stream 70c entering the regenerator.

Overhead gas from the solvent regenerator contains essentially all $CO_2$, $H_2S$, and propane-plus hydrocarbons contained in the feed to this column. The $CO_2$ and $H_2S$ are separated from the hydrocarbons by a conventional $H_2S$ removal unit 71, such as a DEA treating unit. The sweet gas 73 from the treating unit is combined with bottoms from the stabilizer to form natural gas liquid (NGL) product. The $H_2S$ and $CO_2$ stream 75 at the exit of the removal unit are preferably maintained at a mole ratio of about 1:1, which is the desired ratio for feed to a Claus process.

If ethane is desired in the NGL recovery, normal paraffin hydrocarbons can be substituted for a portion of the aromatic and/or naphthenic solvent. Specifically, up to about 60% by weight of the solvent can be normal paraffins, including n-heptane, n-octane, n-nonane, n-decane or mixtures thereof. At paraffin concentrations greater than about 60%, however, absorption of hydrogen sulfide is reduced. Because ethane is more soluble in the paraffins than in the aromatics or napthenes, the ethane in the fractionator is removed as a component of the bottom stream rather than the overhead when paraffins are present. It is then recovered from the $H_2S$ removal unit along with the higher hydrocarbons.

The overhead vapor stream 72 from the carbon dioxide fractionator contains all the carbon dioxide, methane and less than about 100 ppm and preferably less than about 50 ppm $H_2S$. If no n-paraffins are contained in the fractionator solvent, the overhead also contains all the ethane. The overhead is cooled in the demethanizer feed condenser 74 prior to entering the demethanizer 18. Operating pressure of the demethanizer is generally about 10 psi lower than the $CO_2$ fractionator but may be higher if a compressor (not shown) is used. Generally the operating pressure may vary from about 190 psia to about 900 psia. In the condenser 74, stream 72 is cooled to a temperature of from about $-15°$ F. to about $+15°$ F. (depending on the stream pressure), to cause condensation of about 98% of the total feed weight. The resulting two-phase mixture is fed to the demethanizer where residue hydrocarbon gas is separated from the carbon dioxide. Bottoms reboiler duty is supplied by condensing propane refrigerant at 81 psia in condenser 76 and the top tray vapor of the stabilizer in the reflux heat exchanger 49.

Overhead vapor stream 78 from the demethanizer can contain from about 15 mole percent up to about 57 mole percent carbon dioxide, the rest being methane and optionally ethane, depending on whether n-paraffins are present in the solvent, as explained above. The temperature of the overhead is from about $-30°$ F. to about $-65°$ F. Additionally, this stream may contain a small amount of other gases, such as nitrogen. Reflux is provided by condenser 79, separator 80 and reflux stream 81. The duty for the demethanizer overhead condenser 79 can be supplied in one of two ways: In the early years of well production, while $CO_2$ concentration in the feed is low, the carbon dioxide liquid produced from the demethanizer bottom can be flashed down to about 100 psia. The duty is then obtained by vaporizing the cold carbon dioxide liquid product at 100 psia. Thus, carbon dioxide functions as a refrigerant in this operation. Carbon dioxide vapor generated thereby is recycled to the suction drum 82 of the second stage feed gas compressor 22. Alternatively, when $CO_2$ content is dominant in the feed, a low temperature propane refrigerant compressor (not shown) is operated to provide refrigeration duty at $-35°$ F.

Demethanizer overhead 78 is fed to a residue gas absorber 84, such as a Selexol contactor. Other solvents normally selected for $CO_2$ removal can also be used. The solvent in the absorber, for example, Selexol, strips the carbon dioxide from the overhead by absorption. The $CO_2$ is released upon regeneration of the solvent under reduced pressure and heating in flash vessels 86 and 88.

Another alternate arrangement (not shown) for residual $CO_2$ removal utilizes the excellent ability of the solvent in the $CO_2$ fractionator to absorb $CO_2$ at temperatures below $0°$ F. The solvent, originally sent to the $CO_2$ fractionator, is directed to an overhead condenser of absorber 84 where propane refrigeration is supplied to maintain a cold temperature of about $-35°$ F. The cold solvent flows countercurrently with the gas from the demethanizer overhead 78 to remove $CO_2$. The bottom product of absorber 84 containing $CO_2$ and the solvent can be used as the reflux to the carbon dioxide fractionator 14.

The residual hydrocarbon gas stream 90 from the absorber 84 comprises methane and some ethane and can be used as fuel or is compressed in compressor 92 and used as sales gas. The ethane content in stream 90 is dependent on the use of paraffins in the $CO_2$ fractionator. The $CO_2$ content in the gas is normally less than 5 mole percent and preferably 1 mole percent or less. The flash vapor streams 94 and 96, mainly carbon dioxide, are recycled to the first and second stage suction drums 98 and 82 of the feed compressors 20 and 22. The liquid stream 100 from flash vessel 88, consisting of solvent and residual carbon dioxide, enters ambient pressure regenerator 102 where $CO_2$ is stripped by countercurrent air flow. The solvent stream 104 is then recycled to the absorber 84 after being cooled to about $10°$ F. in exchangers 106 and 108. The stripped carbon dioxide is vented to atmosphere.

Carbon dioxide liquid produced in the demethanizer bottom stream 110 normally has a purity of greater than 95 mole percent. It can be pumped to the well injection pressure of above 1800 psig and reinjected at the well site. Since the discharge temperature of the $CO_2$ product pump 112 is still cold (about $10°$ F.), it can be used to cool the feed and glycol streams in heat exchangers 28, 32 and 34.

While the foregoing represents a disclosure of the best mode and the preferred embodiment as required by the Patent Statutes, it is to be understood that the invention is not limited thereto or thereby. Rather, it is contemplated that additions and modifications can be made without departing from the scope of the invention. For example, the operating pressures and temperatures of the $CO_2$ fractionator, demethanizer, etc., will vary depending on the particular choice of solvent and the composition of the feed stream. Multiple reboilers, compressors, condensers and the like are used for purposes of energy conservation and improved heat integration. Such arrangements can be altered depending on circumstances to meet a particular need or design criteria. Additionally, those skilled in the art will recognize the need for pumps, valves, and the like at appropriate locations in the process streams.

What is claimed is:

1. A method for recovery of carbon dioxide from a hydrocarbon feed stream containing carbon dioxide, methane and higher boiling hydrocarbon constituents, hydrogen sulfide, and water, comprising:

dehydrating and phase separating the feed stream in a stabilizer column containing a glycol compound, forming thereby a glycol/water phase, a liquid phase of heavy hydrocarbons, and a gas phase containing carbon dioxide, hydrogen sulfide and light hydrocarbons;

removing hydrogen sulfide and a portion of the light hydrocarbons from the gas phase in a carbon dioxide fractionation step which includes injecting a solvent into a fractionator column to absorb hydrogen sulfide and hydrocarbons and to increase the relative volatility between the carbon dioxide and hydrogen sulfide, wherein the solvent, hydrogen sulfide and hydrocarbons exit the fractionator as a bottom product; and separating and recovering carbon dioxide from the residual hydrocarbons left in the overhead from the fractionator by distilling the overhead in a demethanizer column under conditions which produce liquid carbon dioxide as a bottom product.

2. The method of claim 1, wherein the method further includes the steps of regenerating the solvent by feeding the bottom product from the fractionator to a solvent regenerating column to produce hydrogen sulfide and residual hydrocarbons as an overhead and solvent as a bottom product, recycling the solvent to the fractionator column;

feeding the overhead from the regenerating column to a hydrogen sulfide removal unit for separating the hydrogen sulfide from the hydrocarbons; and combining the hydrocarbons so separated with the heavy hydrocarbons from the stabilizer column to form natural gas liquids;

3. The method of claim 2, further including:

producing an overhead stream from the demethanizer comprising carbon dioxide and natural gas;

removing the carbon dioxide from the natural gas in said overhead stream through absorption in a liquid;

flashing the carbon dioxide from the liquid; and recycling the flashed carbon dioxide to the hydrocarbon stream entering the stabilizer column.

4. The method of claim 3, wherein the solvent is selected from aromatic compounds having molecular weights between about 90 and about 125 and freezing points below $-50°$ F., napthenic hydrocarbons having molecular weights between about 80 and about 130 and freezing points below about $-50°$ F., and mixtures of aromatics and/or napthenics.

5. The method of claim 4, wherein the carbon dioxide fractionator is operated at a overhead temperature of from about $-30°$ F. to about $30°$ F. and at a pressure of from about 200 psia to about 800 psia.

6. The method of claim 5, wherein the demethanizer is operated at an overhead temperature of from about $-30°$ F. to about $-65°$ F. and at a pressure of from about 190 psia to about 900 psia.

7. The method of claim 6, wherein the solvent is selected from the group consisting of toluene, ethyl benzene, m-xylene, isopropyl benzene, methylcyclopentane, methylcyclohexane, and combinations thereof.

8. The method of claim 7, wherein the stabilizer is operated at a pressure of from about 200 psia to about 400 psia and at a temperature of about $40°$ F.

9. The method of claim 8, wherein the hydrocarbon feed stream, prior to entering the stabilizer column, is compressed and cooled to about 360 psia and 65° F. and thereafter phase separated to remove a condensed aqueous phase.

10. The method of claim 9, wherein the solvent is toluene and the carbon dioxide factionator is operated at a temperature of about 0° F. and at a pressure of about 320 psia.

11. The method of claim 9, wherein the solvent contains from 0 to about 60 weight % of normal paraffin hydrocarbon selected from the group consisting of n-heptane, n-octane, n-nonane, n-decane and combinations thereof, said paraffin hydrocarbon serving to increase the amount of ethane in the recovered natural gas liquids.

12. An apparatus for recovery of carbon dioxide from a hydrocarbon feed stream containing carbon dioxide, methane and higher boiling hydrocarbon constituents, hydrogen sulfide, and water, comprising:

a stabilizer column for separation of heavy hydrocarbons and water from a gaseous stream of carbon dioxide, light hydrocarbons and hydrogen sulfide;

a carbon dioxide fractionator for removal of hydrogen sulfide and a portion of the light hydrocarbons from the gaseous stream by means of solvent injection, wherein solvent injected into the fractionator absorbs hydrogen sulfide and hydrocarbons and increases the relative volatility of carbon dioxide to hydrogen sulfide, the solvent and absorbed components constituting a bottom product from the fractionator and the remaining components of carbon dioxide and residual hydrocarbons constituting a gaseous overhead; and a demethanizer column for separating the gaseous overhead stream from the carbon dioxide fractionator into a liquid carbon dioxide bottom stream and a gaseous overhead of residual hydrocarbons and carbon dioxide.

13. The apparatus of claim 12, including a solvent regenerator for separation of the solvent in the fractionator bottom product from the absorbed hydrogen sulfide and hydrocarbons, the regenerator having a recycle stream for recycling solvent to the carbon dioxide fractionator.

14. The apparatus of claim 13, including:

a residue gas absorber in which carbon dioxide is absorbed from the overhead stream of residual hydrocarbons and carbon dioxide from the demethanizer by means of a residue gas solvent; and sequential flash vessels in which the absorbed carbon dioxide is flashed from the residue gas solvent under reduced pressure and heating, the flash vessels each having a recycle stream from recycling the flashed carbon dioxide to the hydrocarbon stream entering the stabilizer column.

15. The apparatus of claim 14, wherein the solvent is selected from aromatic compounds having molecular weights between about 90 and about 125 and freezing points below about $-50°$ F., napthenic hydrocarbons having molecular weights between about 80 and about 130 and freezing points below about $-50°$ F., and mixtures thereof.

16. The apparatus of claim 15, wherein the solvent is selected from the group consisting of toluene, ethylbenzene, benzene, m-xylene, isopropylbenzene, methylcyclopentane, methylcyclohexane and combinations thereof.

17. The apparatus of claim 16, including a phase separator for removal of a condensed aqueous phase from the feed stream prior to the stabilizer.

18. The apparatus of claim 17, wherein the solvent is toluene.

19. The apparatus of claim 18, wherein the solvent contains from 0 to about 60 weight % of normal paraffin hydrocarbon selected from the group consisting of n-heptane, n-octane, n-nonane, n-decane and combinations thereof, said paraffin hydrocarbon serving to increase the amount of ethane in the recovered natural gas liquids.

* * * * *